United States Patent [19]

McMahon

[11] 4,130,342
[45] Dec. 19, 1978

[54] PASSIVE OPTICAL CHANNEL CROSSOVER, SWITCH AND BEND STRUCTURE

[75] Inventor: Donald H. McMahon, Carlisle, Mass.

[73] Assignee: Sperry Rand Corporation, New York, N.Y.

[21] Appl. No.: 801,661

[22] Filed: May 31, 1977

[51] Int. Cl.² ............................................. G02B 5/14
[52] U.S. Cl. .............................. 350/96.14; 350/96.13; 350/355
[58] Field of Search ............... 350/96.11, 96.12, 96.13, 350/96.14, 96.15, 355, 356

[56] References Cited

U.S. PATENT DOCUMENTS

| | | | |
|---|---|---|---|
| 3,558,213 | 1/1971 | Marcatili | 350/96.12 |
| 3,622,911 | 11/1971 | Marcatili | 350/96.12 X |
| 4,008,947 | 2/1977 | Baües et al. | 350/96.14 |

OTHER PUBLICATIONS

White "Integrated Optics Thin-Film Mirror", IBM Tech. Discl. Bull., vol. 18, No. 9, Feb. 1976, pp. 3134–3135.

Primary Examiner—John K. Corbin
Assistant Examiner—John D. Lee
Attorney, Agent, or Firm—Howard P. Terry; Seymour Levine

[57] ABSTRACT

An optical structure comprising a multiplicity of optical channels crossing in a plane, constructed to provide high interchannel isolation with low optical signal attenuation. Each channel possesses a refractive index that is greater than the refractive index of the encompassing planar material and is separated from the optical channel interaction region by an optical propagating material, having a refractive index that is less than the refractive index of the optical channels, which is inserted along each border between the optical channels and the channel interaction region formed by the crossover. Other embodiments of the invention provide low loss optical channel bends and a high isolation, low loss, double pole, double throw optical channel switch.

25 Claims, 7 Drawing Figures

PRIOR ART

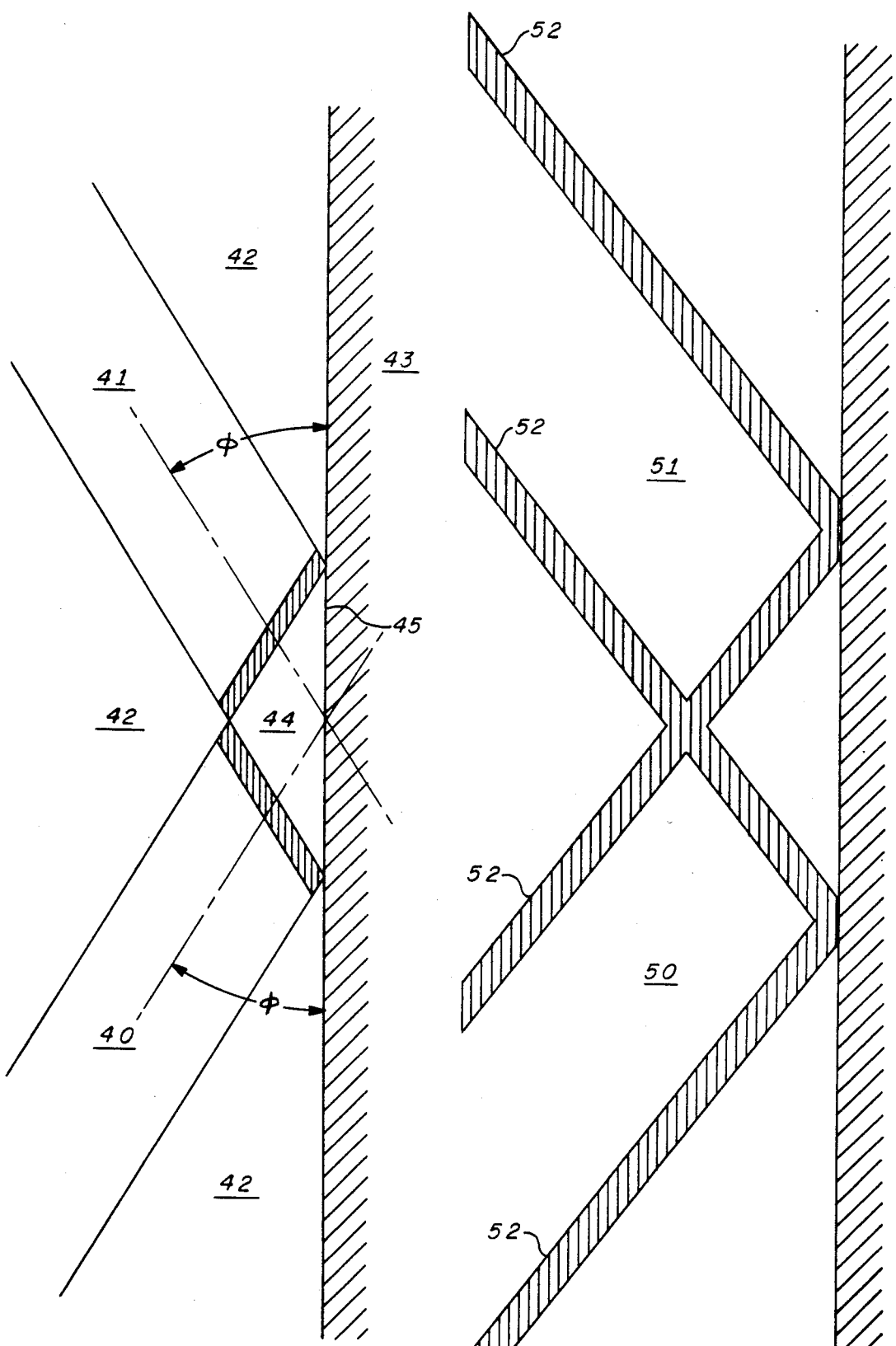

PASSIVE OPTICAL CHANNEL CROSSOVER, SWITCH AND BEND STRUCTURE

BACKGROUND OF THE INVENTION

1. Field of the Invention

This invention pertains to optical channels and more particularly to low loss, high isolation, in-plane crossover structures for the intersection of two optical channels, optical channel bends and a low loss, high isolation optical channel switch.

2. Description of the Prior Art

During the assembly of an optical system, it may be necessary to cross two light guiding channels existing in a common planar single crystal platelet without coupling light signals from one channel to the other channel. Crossovers of this type in the prior art presented fabrication difficulties, requiring that the light guiding channels remain separate and distinct, thus necessitating a transition of at least one of the channels from the initial common plane to another plane in which only one of the crossing channels is situated or conversely did not provide sufficient isolation when the channels cross at small angles with respect to one another.

Refer to FIG. 1 wherein is shown, in schematic form, an in-plane crossover of two light guiding channels as would be fabricated without the present invention. Light guiding channels A and B have equal refractive indices and form an angle $\Phi$ in the crossover plane. The refractive index N of the remaining planar material C is selected such that light diverging within the angular limits of $-\theta$ and $+\theta$, with respect to channels A and B, are constrained within the channels A and B respectively. An optical wave incident to the crossover region from one of the channels (channel A in FIG. 1) may couple a portion of the light energy to the second channel (channel B in FIG. 1) which lies at an angle $\gamma$ with respect to the direction of the second channel. When $\Phi$ is less than $2\theta$, $\gamma$ may be less than $\theta$ and a portion of the light energy propagating in the first channel may enter and propagate down the second channel to an output port thereof. When $\Phi$ is greater than $2\theta$, $\gamma$ will in all cases be greater than $\theta$ and the portion of the light energy coupled into the second channel, rather than propagating therein, will be radiated through the channel boundary D into the remaining planar material C. In the latter situation, cross coupling between the channels has been eliminated at the expense of an attenuation (due to the radiation loss at the channel crossover) of the light signal propagating in the first channel.

It is desirable to have an in-plane optical waveguide crossover structure that passively provides channel isolation without an attendant loss of light energy.

SUMMARY OF THE INVENTION

According to this invention, two optical channels having substantially equal refractive indices, and surrounded by an optical material having refractive index less than the refractive index of the optical channels, may be crossed in a plane with low attenuation and high isolation characteristics. This crossover construction comprises strips of optical material, having an index of refraction that is less than the index of refraction in the optical channels which are inserted in the light propagating paths of the optical channels at the boundaries of the interaction region formed by the crossover of the two channels. Light waves incident onto these two strips at angles of incidence, measured with respect to the strip boundaries, greater than the critical angle will propagate therethrough, while light waves incident at angles at less than the critical angle are reflected therefrom. Thus, light energy propagating in one channel, within the angle of divergence therefore, are transmitted through the strips at the boundary with the interaction region with low loss, are reflected from the strips inserted at the boundaries of the second optical channel with the interaction region, and are transmitted through the optical strip at the opposite boundary between the interaction region and the channel in which the light wave is propagating, to continue to propagate therein. The interaction region may be modified by placing an electrode along a diagonal of the interaction region to provide a double pole, double throw optical switch. With no voltage applied to this electrode, the switch operates as an in-plane optical channel crossover. When a voltage of sufficient magnitude is applied to the electrode, the index of refraction along the diagonal of the interaction region is lowered to effectively create an optical mirror along this diagonal. All light energy propagating in one optical channel is thereby reflected therefrom to propagate in the other optical channel. A further modification replaces the electrode with an optical material having an index of refraction that is sufficiently less than the index of refraction of the optical channels, such that all light energy propagating in one of the channels is reflected therefrom to propagate in the other channel, thus effectuating a low loss optical channel bend structure.

BRIEF DESCRIPTION OF THE DRAWINGS

FIG. 6 shows an embodiment of the invention that provides a low pass optical channel bend.

FIG. 7 is an illustration of a modification of an embodiment of FIG. 6.

DESCRIPTION OF THE PREFERRED EMBODIMENTS

Figure 1:
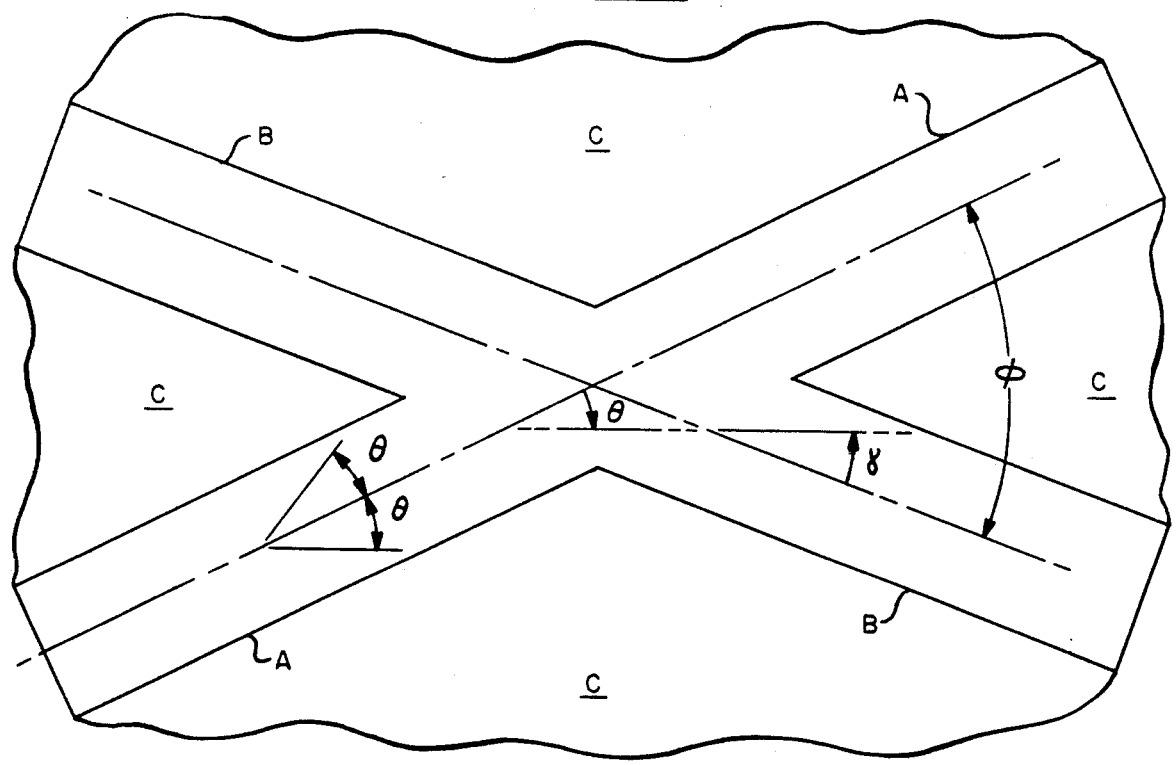
FIG. 1 is a representation of an in-plane crossover of two optical channels useful in explaining the prior art.
Figure 2:
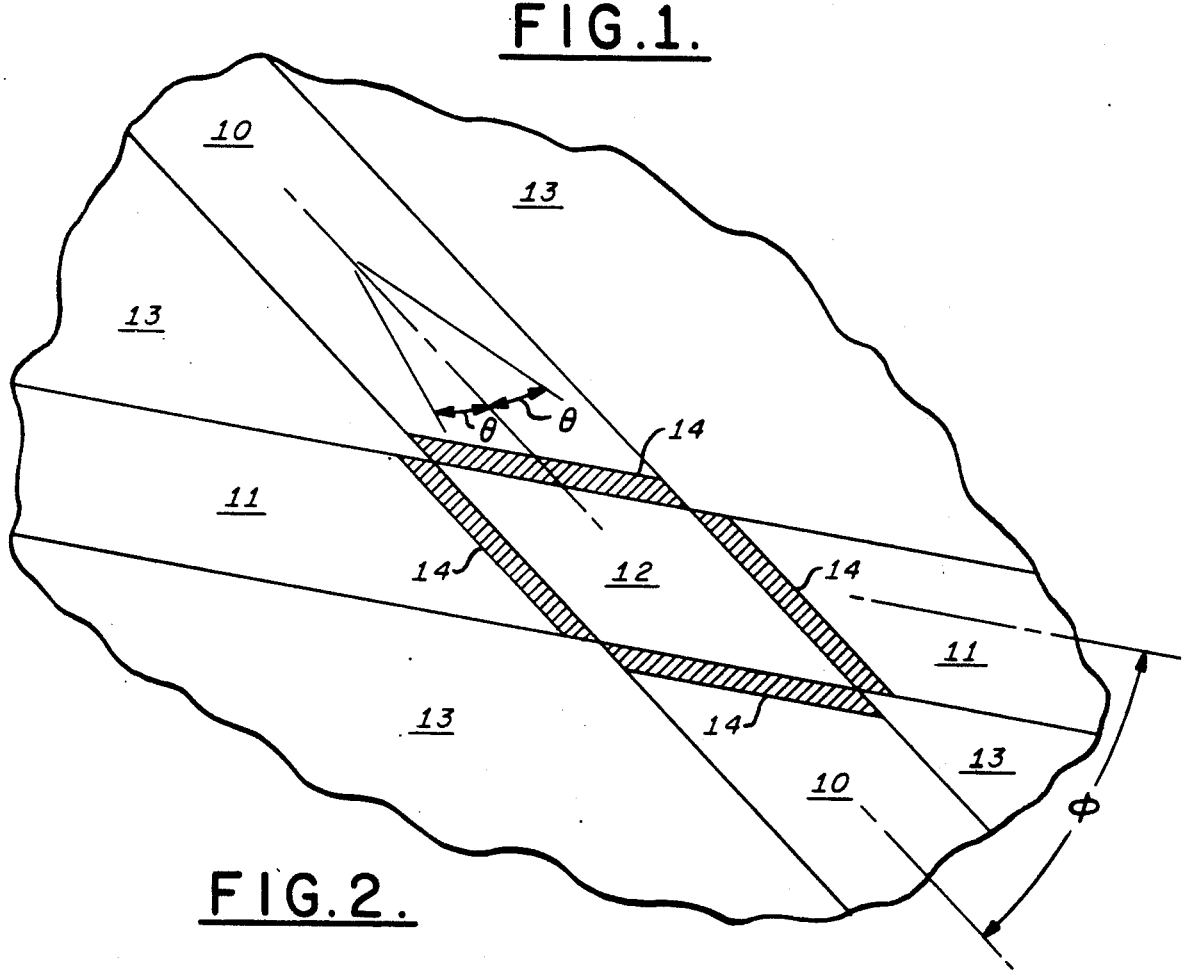
FIG. 2 shows an in-plane crossover of two optical channels according to an embodiment of the invention.

Refer now to FIG. 2 wherein is shown an optical channel 10, having an index of refraction n, that is crossed at an angle $\Phi$ by a second optical channel 11, having a refractive index n, the crossover creating an interaction region 12. Optical channels 10 and 11 extend through optical material 13 which has a refractive index $N_1$ that is less than n. Strips of optical material 14 with refractive index $N_2$, that is also less than n, are inserted in the optical channels 10 and 11 at their boundaries with the interaction region 12. For simplicity of explanation, assume that $N_1 = N_2$ and that $\Phi = 2\theta$. With these assumptions a light wave propagating in the first channel 10, with diverging angles between $-\theta$ and $\theta$ with respect to the direction of the channel 10, will first strike the inserted optical material 14 at angles ranging from $\theta°$ to $2\theta°$. Even though the refractive index of the inserted strips 14 is less than the refractive index of the optical material in channel 10, the optical wave is incident onto the strips 14 at an angle greater than the critical angle, and thus will experience low loss transmission through the strips 14. Upon entering the interaction region 12, the transmitted light encounters the strips 14, which appear as sidewalls to the propagating region, to which they are incident at angles less than the critical angle $\theta_c$ and are reflected therefrom, thus forming a continuation of the optical channel 10 without coupling optical energy into optical channel 11. The transmitted light is then incident to the strips 14 at the far end of the interaction region at angles of incidence within the range of $\theta$ and $2\theta$, and is consequently transmitted therethrough to continue to propagate in the remainder of the optical channel.

When the index of refraction of the strips 14 is less than or substantially equal to the index of refraction of the remaining optical material 13, a portion of the light energy entering the strips 14 may radiate into the remaining optical material 13, thus adversely affecting the low loss characteristics of the optical channel crossover. Radiation into the optical material 13 may be prevented, while still maintaining the low loss characteristics of the in-plane crossover by selecting a refractive index $N_2$ within the range determined by $N_1 < N_2 < n$. With $N_2$ greater than $N_1$, the diverging critical angle for waves incident to the strips 14 is increased, thus providing for the transmission of all the propagating light energy through the interaction region 14, into the remaining section of the optical channel 10.

The above operational description is equally applicable to the second optical channel 11. Ideal operation of the crossover is predicated on the theory that the reflection of light energy abruptly decreases from complete reflectivity to zero reflectivity as the angle of light, incident onto a strip 14, is increased beyond the critical angle and that all light energy incident at angles at and greater than the critical angle are transmitted freely therethrough. Although the reflectivity is complete at angles of incidence below the critical angle, the reflectivity does not abruptly decrease to zero at this angle, but rather has a finite value which decreases rapidly as the angle of incidence increases therebeyond. To avoid the deleterious effects of finite reflectivity, when $N_1 = N_2$, at angles just greater than the critical angle, the angle $\Phi$, formed by the optical channels 10 and 11, may be increased slightly beyond $2\theta$. When $N_2$ is greater than $N_1$, the critical angle of incidence to the strips 14 is increased. Since the maximum angle of the divergent angular envelope is determined by the values of n and $N_1$, the angles of incidence in the propagating channels to the strips 14, will always be greater than the critical angle, thus effectively minimizing the deleterious effects of reflections near thereto, as well as eliminating losses due to radiation into surrounding optical medium 13.

Figure 3:
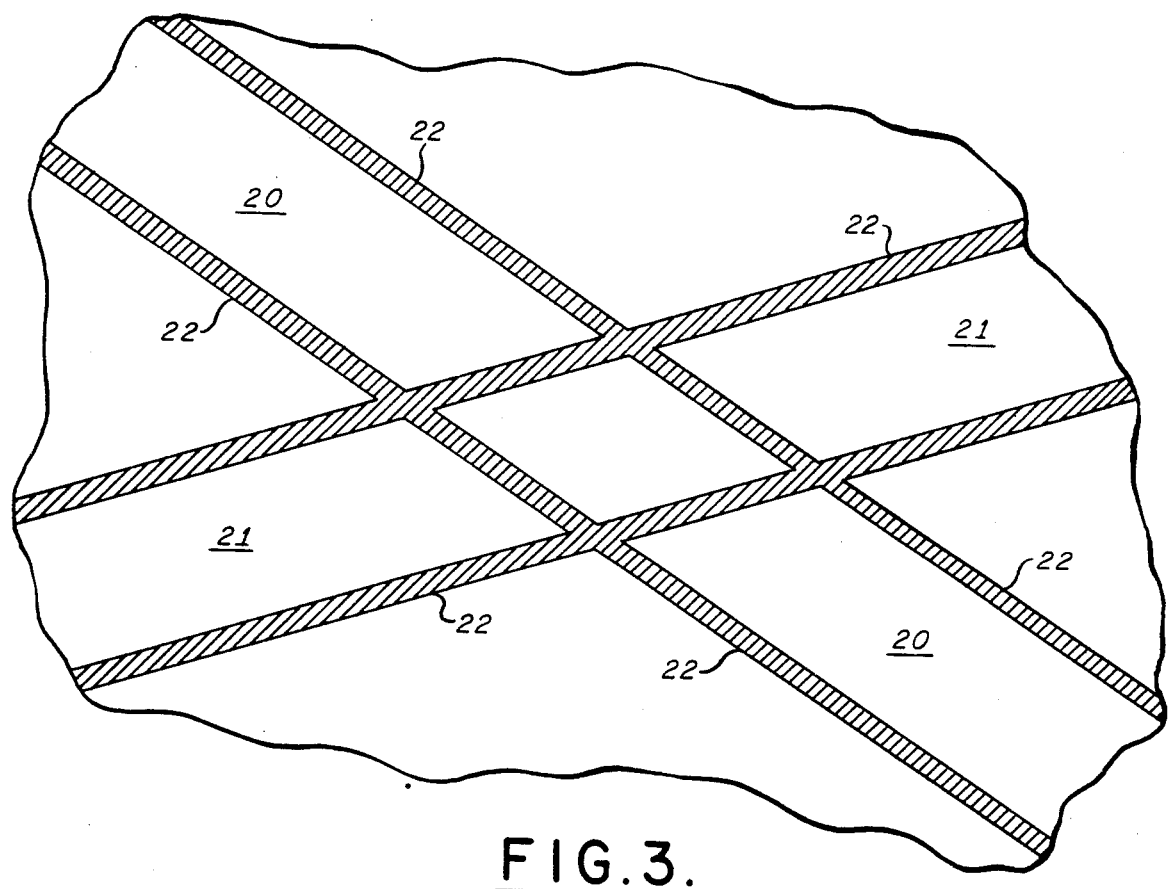
FIG. 3 is an illustration of a modification of the in-plane crossover of FIG. 2.

A light guiding channel may be created by utilizing well-known techniques such as ion diffusion, electro-optic effects or photo-polymers to alter the refractive index within a channelized area of a substrate such that the refractive index of the substrate is less than the altered refractive index as represented in FIG. 2. Alternatively, an optical channel may be created by lowering the refractive index on either side of the desired channel as shown in FIG. 3. In FIG. 3, the crossing optical channels 20 and 21 are formed by utilizing techniques well known in the art to reduce the refractive index along relatively narrow strips 22 in the substrate to provide barrier walls between which optical channels 20 and 21 are defined. For these barrier type optical channels, the regions of lower refractive index need only be as wide as the evanescent wave distribution of the propagated modes. Cross coupling and attenuation characteristics of the channel crossover shown in FIG. 3 are identical to the cross coupling and attenuation characteristics of the channel crossover of FIG. 2.

Figure 4:
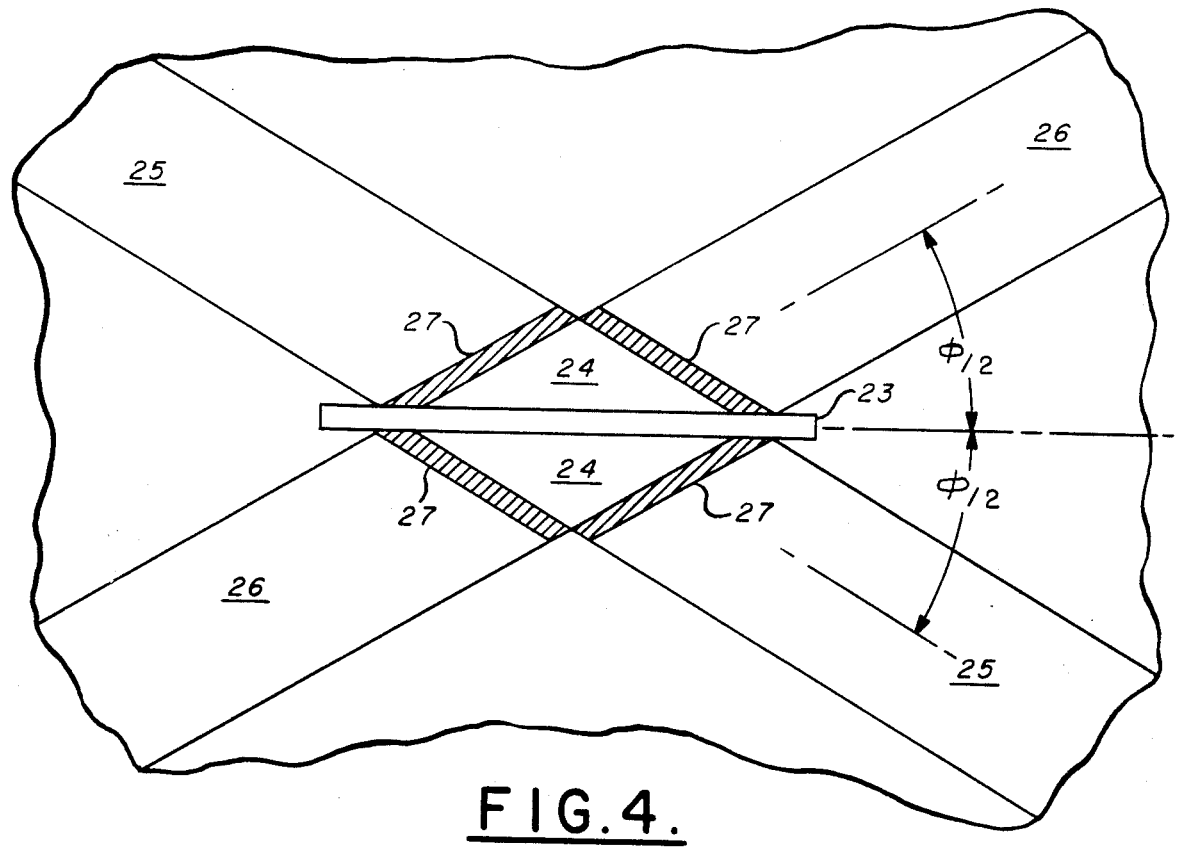
FIG. 4 is an illustration of a modification of FIG. 1 to effectuate a double pole, double throw optical channel switch.

The principles discussed with reference to FIGS. 2 and 3 may be further extended to design a double pole, double throw (DPDT) optical switch. As illustrated in FIG. 4, an electrode 23, that is coupled to a voltage source (not shown), is positioned diagonally across the interaction region 24 forming an angle $\Phi/2$ with optical channels 25 and 26. The optical channels and the interaction region 24 may be comprised of $LiTaO_3$, $LiNbO_3$ or any other electro-optic material. With no voltage applied to the electrode 23 from the external voltage source, the operation of the DPDT is as described for the optical channel crossover of FIGS. 2 and 3. When a voltage is applied to the electrode 23 with the proper polarity and of sufficient amplitude to reduce the refractive index of the optical material in the region of the electrode 23 to reflect optical signals subtending angles up to $\Phi/2 + \theta$ with the diagonal of the interaction region 24, all light energy propagating in either optical channel 25 or 26 is reflected from the region of the electrode 23 to propagate in the adjacent optical channel, either by direct reflection therefrom or by a second reflection from an inserted strip 27. This ideal result would not occur if a light beam could pass from the input channel to the output channel without first striking the induced mirror boundary. In such a case, some portion of the non-reflected light beam would subtend an angle greater than $\theta$ with respect to the output channel and would be radiated from the sidewalls thereof. It will be recognized by those skilled in the art that a voltage with proper polarity but insufficient amplitude to reduce the refractive index in the region of the electrode 23 to provide total reflection therefrom will establish a partial mirror condition, thus coupling a fraction of the optical signal propagating in one channel to the other channel while the remainder continues to propagate in the original channel.

Figure 5:
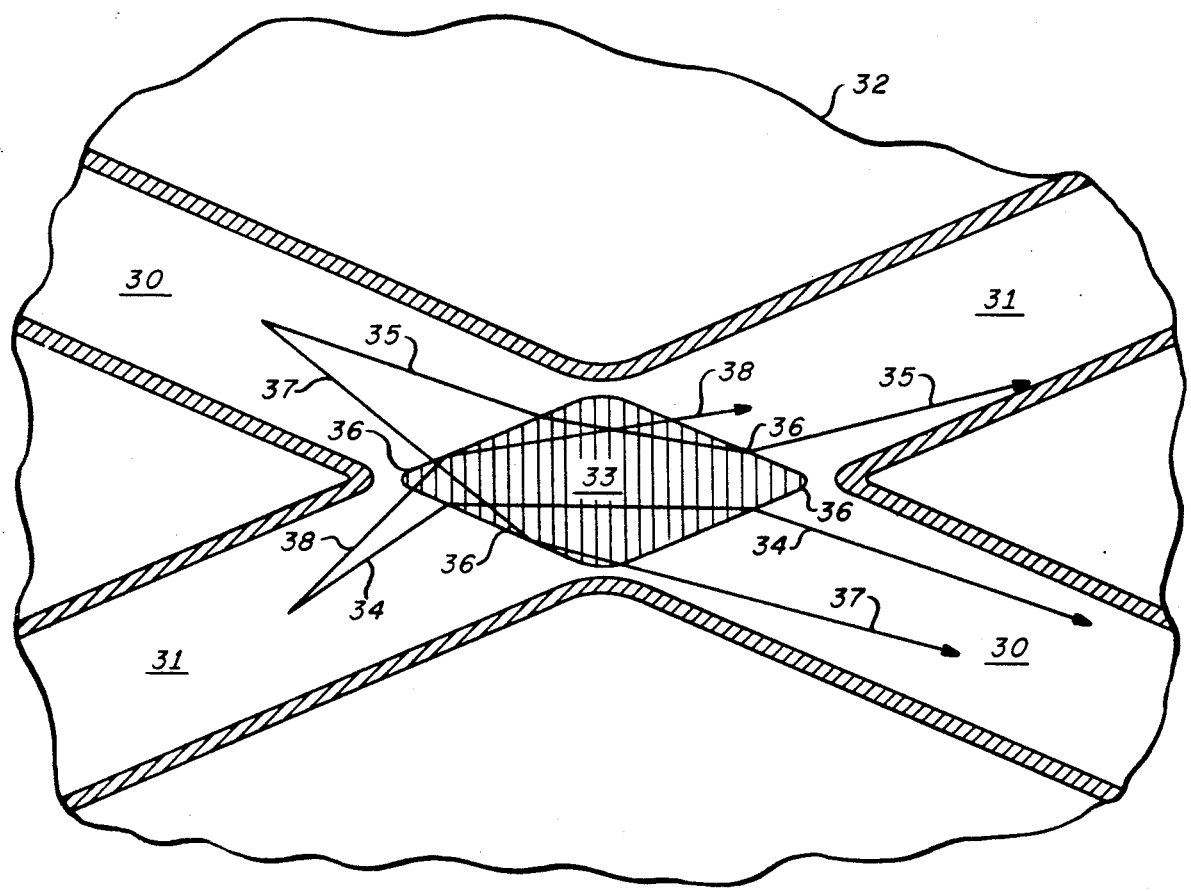
FIG. 5 is an illustration of a modification to FIG. 3 to effectuate a double pole, double throw optical channel switch.

Refer now to FIG. 5 wherein is shown crossing barrier type optical channels 30 and 31 which may be formed on an electro-optic substrate 32. Electrodes 33, coupled to a voltage source (not shown), are positioned in the interaction region on the upper and lower surfaces of the substrate 32. A voltage, of proper polarity, applied across the substrate through the electrodes 33 will induce a decrease in the refractive index of the interaction region. When this refractive index decrease is insufficient to cause internal reflections, light propagating in one of the channels 30 and 31 will be refracted to propagate in the other channel as indicated by the ray paths 34 and 35. When the applied voltage is of the proper polarity to induce an increase in the refractive index, the refraction of an optical signal incident to the interaction region will be negligible. For this condition light propagation in the optical channels is similar to that described for the optical channels of FIG. 3. Light will enter the interaction region from either optical channel and be reflected from the sidewalls formed at the edges 36 of the interaction due to the increased refractive index therein and continue to propagate along the original channel, as indicated by rays 37 and 38.

Attention is directed now to an example of the invention in accordance with which a non-radiating passive optical channel bend is effected. As illustrated in FIG. 6, an optical channel crossover having optical channels 40 and 41 each having a refractive index n, with surrounding optical material 42 having a refractive index $N_1$, is bisected and one-half the crossover structure is replaced by an optical material 43 having a refractive index $N_3$ that is less than n. The operation of the bend is similar to that of the DPDT switch with a voltage applied to the electrode diagonally positioned across the interaction region.

Suppose a light wave is propagating in the optical channel 40 and enters the interaction region 44 as previously described. This optical wave will propagate through the interaction region 44 and be incident to the boundary 45 formed by the interaction region 44, with refractive index n, and the optical material 43. This incident wave will be internally reflected from the boundary 45 in a manner similar to that described for the DPDT switch, subsequently coupled to the optical channel 41 and proceed to propagate therein. The ratio $n/N_3$, required to produce internal reflection at the boundary 45, is function of the subtended angle $\Phi$ between either of the optical channels 40 and 41 and the boundary 45 such that this ratio must decrease as the subtended angle between the optical channels and boundary 45 increases (i.e., the propagation direction angular change increases).

The embodiment shown in FIG. 7 may be readily compared with that of FIG. 6. In this construction, the optical channels 50 and 51 are formed by lowering the index of refraction of relatively narrow strips 52 in the substrate to form the borders of the optical channels 50 and 51. Construction of the remainder of the optical channel bend is similar to the construction of the optical channel bend shown in FIG. 6. It will be readily apparent to those skilled in the art that the optical channel bends described above will operate equivalently if only a strip, of sufficient width, length, and refractive index, is positioned along the diagonal of the interaction region. The positioning of this strip being similar to the positioning of the switching electrode 23 in the DPDT switch of FIG. 4.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. An optical channel in-plane crossover comprising:
a plate of substantially transparent optical material having a refractive index $N_1$;
means for forming an optical channel configuration in said plate comprising first and second optical channels each with a refractive index n that is greater than $N_1$ such that optical signals with diverging angles between $-\theta$ and $+\theta$ with respect to the direction of said optical channels propagate therein, said first and second optical channels crossing at a predetermined crossing angle to form an interaction region with a refractive index n and having four sides forming boundaries with said first and second optical waveguides; and
means for providing strips of substantially transparent optical having a refractive index $N_2$ that is less than n at said four sides forming said boundaries of said interaction region with said first and second optical waveguides, whereby optical signals initially propagating in said first and second optical channels propagate through said interaction region and continue to propagate in said initial propagating channels therebeyond while being substantially reflected in the interaction region from the optical channels in which the optical signals are not initially propagating.

2. An optical channel in-plane crossover in accordance with claim 1 wherein said predetermined crossing angle is at least as great as two time $\theta$.

3. An optical channel in-plane crossover in accordane with claim 2, wherein said refractive index $N_1$ is not greater than said refractive index $N_2$.

4. The in-plane crossover of claim 3 wherein said plate is a substantially transparent electro-optic material.

5. An optical channel in-plane structure in accordance with claim 1 wherein said interaction region comprises an electro-optic material and further includes electrode means positioned to extend diagonally across said interaction region such that upon the application of a voltage to said electrode means the refractive index of the electro-optic material in the region of said electrode means is reduced, causing an optical signal propagating in one of said optical channels to be reflected from said region of said reduced refractive index to propagate in the other of said optical channels.

6. An optical in-plane structure in accordance with claim 5 wherein said predetermined crossing angle is at least as great as two time $\theta$.

7. The in-plane structure of claim 6 wherein said plate is a substantially transparent electro-optic material.

8. The optical in-plane structure of claim 5 wherein said voltage applied to said electrode means is of a magnitude that reduces said refractive index of said electro-optic material to a value that creates a partial mirror in said region of said electrode means whereby an optical signal propagating in one of said first and second optical is caused to divide between said first and second optical channels in accordance with the reflection and transmission coefficients established by said partial mirror.

9. An optical channel in-plane structure in accordance with claim 8 wherein said predetermined crossing angle is at least as great as two time $\theta$.

10. The in-plane structure of claim 9 wherein said plate is a substantially transparent electro-optic material.

11. An optical channel in-plane crossover in accordance with claim 1 wherein said optical channel configuration comprises first and second optical channels crossing at a predetermined crossing angle to form an interaction region with four sides, said first and second optical channels having barrier walls, with refractive index less than $N_1$, between which optical signals may propagate in a region with refractive index $N_1$, each of said barrier walls continuing in an uninterrupted fashion past interaction region collinearly with one of said strips at said boundary of said interaction region, thus forming strips f substantially transparent optical material with refractive index less than $N_1$ at said four sides of said interaction region.

12. An optical channel in-plane crossover in accordance with claim 11 wherein said predetermined crossing angle is at least as great as two times $\theta$.

13. The in-plane crossover of claim 12 wherein said plate is a substantially transparent electro-optic material.

14. An optical channel in-plane structure in accordance with claim 11 wherein said interaction region comprises an electro-optic material and furhter includes electrode means position to extend diagonally across said interaction region such that, upon the application of a voltage to said electrode means the refractive index of the electro-optic material in the region of said electrode means is reduced, causing an optical signal propagating in one of said optical channels to be reflected from said region of said reduced refractive index to propagate in the other of said optical channels.

15. An optical channel in-plane structure in accordance with claim 14 wherein said predetermined crossing angle is at least as great as two times $\theta$.

16. The in-plane structure of claim 15 wherein said plate is a substantially transparent electro-optic material.

17. The optical in-plane structure of claim 14 wherein said voltage applied to said electrode means is of a magnitude that reduces said refractive index of said electro-optic material to a value that creates a partial mirror in said region of said electrode means whereby an optical signal propagating in one of said first and second optical channels is caused to divide between said first and second optical channels in accordance with the reflection and transmission coefficients established by said partial mirror.

18. An optical channel in-plane structure in accordance with claim 17 wherein said predetermined crossing angle is at least as great as two times $\theta$.

19. The in-plane structure of claim 18 wherein said plate is a substantially transparent electro-optic material.

20. An otpical channel in-plane structure in accordance with claim 11 wherein said first and second optical channels terminate at said interaction region and said interaction region is terminated by an optical medium with refractive index less than n located at the diagonal defined by said terminated first and second optical channels whereby an optical signal propagating in one of said optical channels, that enters said interaction region, is reflected from said optical medium at said interaction channel diagonal to propagate in the other of said optical channels, thereby forming an optical channel in-plane bend.

21. An optical channel in-plane structure in accordance with claim 20 wherein said predetermined crossing angle is at least as great as two times $\theta$.

22. The in-plane structure of claim 21 wherein said plate is a substantially transparent electro-optic material.

23. An optical channel in-plane structure in accordance with claim 1 wherein said first and second optical channels terminate at said interaction region and said interaction region is terminated by an optical medium with refractive index less than n located at the diagonal defined by said terminated first and second optical channels whereby an optical signal propagating in one of said optical channels, that enters said interaction region, is reflected from said diagonal to propagate in the other of said optical channels thereby forming an optical channel in-plane bend.

24. An optical channel in-plane structure in accordance with claim 23 wherein said predetermined crossing angle is at least as great as two times $\theta$.

25. The in-plane structure of claim 24 wherein said plate is a substantially transparent electro-optic material.

* * * * *